United States Patent

[11] 3,527,131

| [72] | Inventors | Charles Ellerin<br>3604 Woodvalley Drive, Baltimore,<br>Maryland 21208;<br>Eugene B. Laskin, 2419 Lightfoot Drive,<br>Baltimore, Maryland 21209 |
|---|---|---|
| [21] | Appl. No. | 718,488 |
| [22] | Filed | April 3, 1968 |
| [45] | Patented | Sept. 8, 1970 |

[54] MAT CUTTER
6 Claims, 10 Drawing Figs.

[52] U.S. Cl................................................. 83/522,
83/564, 83/581, 83/614, 83/620, 83/638
[51] Int. Cl................................................. B26d 5/10,
B26d 1/10, B26d 2/02
[50] Field of Search.................................... 83/522,
563, 564, 581, 614, 620, 638

[56] References Cited
UNITED STATES PATENTS

| 513,851 | 1/1894 | Wheeler.................. | 83/581X |
| 571,677 | 11/1896 | Murdoch................ | 83/581X |
| 611,238 | 9/1898 | Drinkhaus.............. | 83/581X |
| 3,130,622 | 4/1964 | Eno....................... | 83/564X |
| 3,301,117 | 1/1967 | Spaulding.............. | 83/614X |

*Primary Examiner*—William S. Lawson
*Attorney*—Walter G. Finch

ABSTRACT: A device is provided for trimming art mats and for cutting bevel edged apertures useful in picture mounting. A ways is mounted on a base plate and carries a sliding cutter block. A rod parallel with the ways supports travel limiting stops. One side of the block is arranged perpendicular to the base plate, while the other side thereof is arranged to slope relative thereto at about 45 degrees.

Both sides of the block mount knife plates assemblies which can be rotated to place their knives in or out of cutting position. When a knife is in a cutting position, a knife corner extends downwardly into clearance channels in the base to define the cutting pathways, whereby a clean cut entirely through the workpiece may accurately be made either square-edged with one knife plate or bevel-edged with the other.

Patented Sept. 8, 1970

INVENTORS
CHARLES ELLERIN
EUGENE B. LASKIN
BY
Walter G. Finch
ATTORNEY

INVENTORS
CHARLES ELLERIN
EUGENE B. LASKIN
BY
*Walter G. Finch*
ATTORNEY

Patented Sept. 8, 1970

INVENTORS
**CHARLES ELLERIN
EUGENE B. LASKIN**

BY *Walter G. Finch*
ATTORNEY

MAT CUTTER

This invention relates generally to cutting apparatus, and more particularly it pertains to a guided knife arrangement.

In the pictorial arts, it is usual to mount pictures for display behind windows cut in mats. A shear cannot be used to make such apertures, and it requires skillful knife manipulation to produce an unwavering cut with accurate termination. The problem is compounded where bevel cuts are desired and the knife must further be held at an exact angle. In all cases, the problem of obtaining a cleanly penetrated non-ragged cut remains.

It is an object of this invention, therefore, to provide a mat cutter arrangement having an improved travelling knife block which does not ride upon the workpiece.

Another object of this invention is to provide a ways arrangement for a traveling block knife holder which will more accurately support and guide a knife in a desired attitude for cutting.

To provide a traveling block knife holder having a quick change arrangement for operatively engaging or disengaging a trimming or a bevelling knife, is another object of this invention.

Other objects and attendant advantages of this invention will become more readily apparent and understood from consideration of the detailed specification and accompanying drawings in which.

Figure 1:
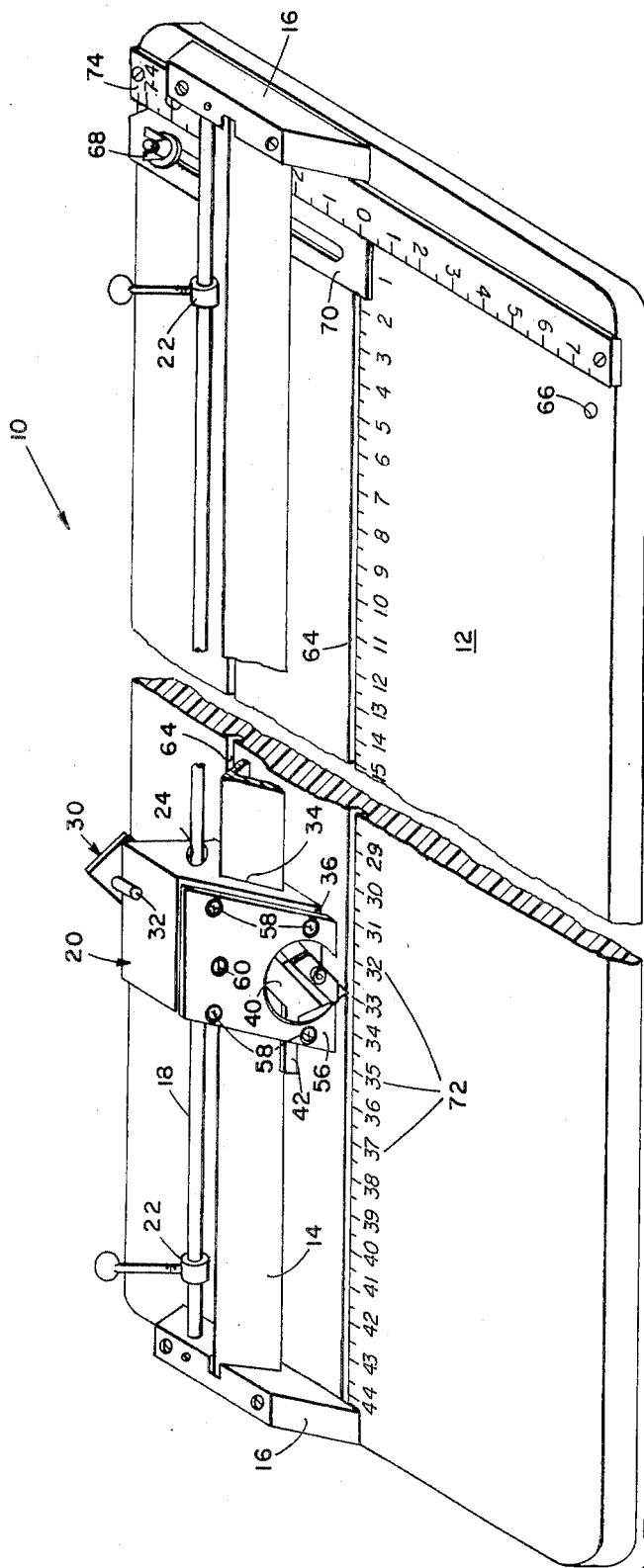
FIG. 1 is a perspective view of a preferred embodiment of a novel mat cutter incorporating features of this invention.
Figure 2:
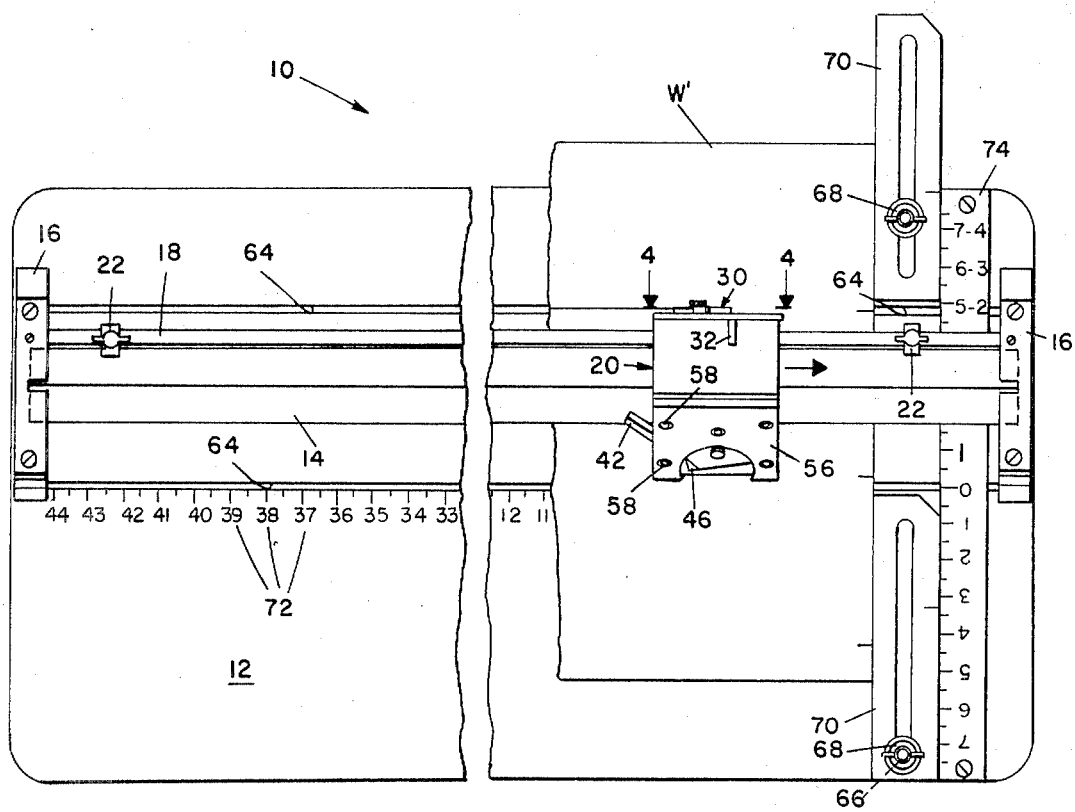
FIG. 2 is a plan view of the mat cutter of this invention showing the bevelling knife moved out of cutting arrangement.
Figure 3:
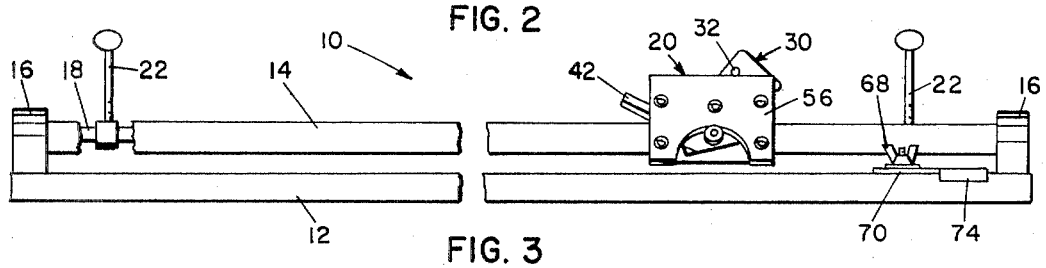
FIG. 3 is a side elevation of the mat cutter of FIG. 1.

Referring now to the details of FIGS. 1, 2, and 3 this improved mat cutter 10 consists of a base 12 of hardwood or composition board. A ways 14 is supported somewhat above the surface across the face of this base 12 by supports 16 at the sides. The ways 14 consists of a length of structural angle and is mounted with the corner edge uppermost away from the base 12.

A rod 18 extends parallel to the ways 14. It is also elevated away from the base by the same supports 16. A cutter block 20, which may be made from a rectangular block of wood, travels on the ways 14 and is pierced as shown in FIG. 7 with a clearance hole 24 for the rod 18.

Figure 6:
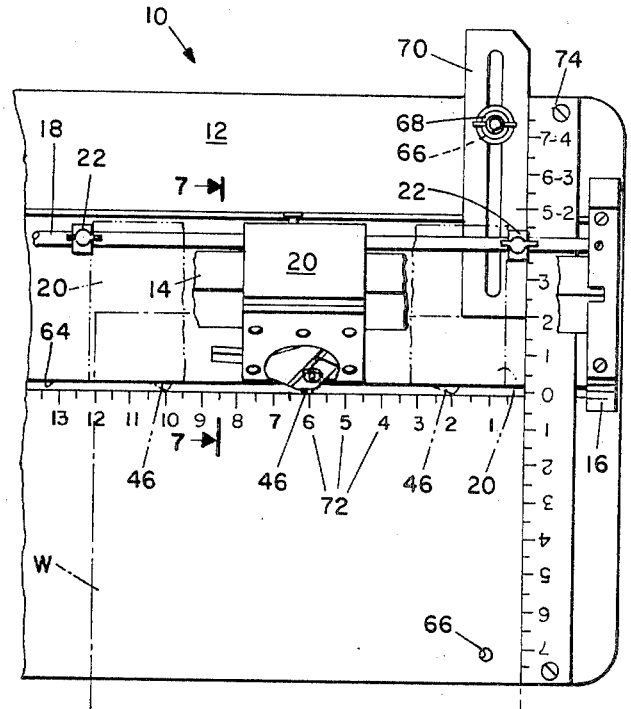
FIG. 6 is a fragmentary plan view similar to FIG. 1 with the bevelling knife in work engagement and showing in phantom lines the travel limit positions of the block.

The extremes of travel of the cutter block 20 are limited when one side or the other engages adjustable stops 22 mounted on the rod 18 as best shown in FIG. 6. A V-shaped saddle cut 34 machined to fit the angle V-shape of the ways 14. A pair of strips 35 (see FIG. 7) captivate the block 20 thereon. The large area of the ways 14 is conductive to smooth sliding thereon and positions the block 20 accurately with its back side always normal to the base 12.

Figure 4:
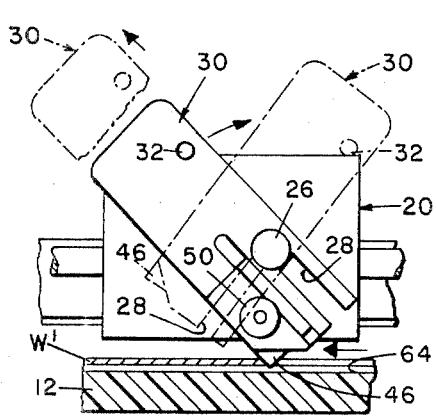
FIG. 4 is an enlarged view taken on 4—4 of FIG. 2 detailing the rear side of the cutter block and showing the trimming knife plate in various positions.
Figure 5:
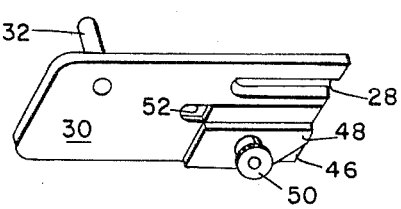
FIG. 5 is a detail perspective of the trimming knife plate assembly.
Figure 7:
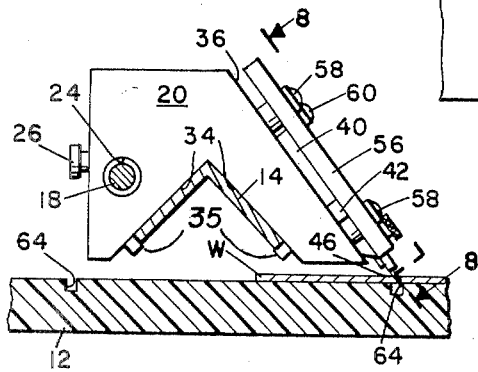
FIG. 7 is an enlarged side view partly in cross section taken on line 7—7 of FIG. 6.

With reference to FIG. 7, a headed stud 26 extends from this back side and acts as a pivot for a trimming knife plate 30 as shown in FIG. 4. When not required, this plate 30 may readily be removed by translation because the stud 26 engages in an open ended longitudinal slot 28 as shown in FIGS. 4 and 5. A pin 32 extends from the face of the plate 30 to act as a stop and limit the pivoting.

The front side of the block 20 is machined at an angle to provide the bevel face 36 as shown in FIG. 7.

Figure 8:
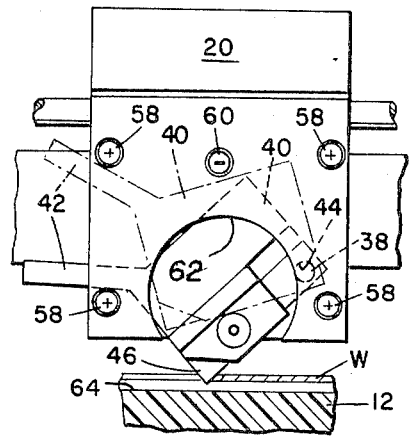
FIG. 8 is a view taken on line 8—8 of FIG. 7 and showing in phantom lines the disengaged position of the bevelling knife plate.
Figure 9:
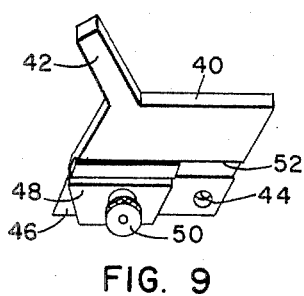
FIG. 9 is a perspective depiction showing the details of the bevelling knife plate assembly.

A pivot pin 38 extends from this face 36 to engage pivot hole 44 of a bevelling knife plate 40 shown in FIGS. 7, 8, and 9. The bevelling knife plate 40 is frictionally held in contact with the bevelled face 36 by an overlying pressure plate 56 mounted on screws and spacers 58.

A clamp screw 60 allows a degree of variation to this friction so the bevelling knife plate 40 may be rotated by means of a handle 42 extending from its side. The extremes of rotation are defined by the two positions shown in FIG. 8 as the handle 42 strikes either the upper or lower of two of the screws 58.

The knife blades 46 are single edge, stiff-backed conventional razor blades. The blade mountings comprising a clamp plate 48 and thumb screw 50 are identical in both the trimming knife plate 30 and bevelling knife plate 40. In each, a groove 52 is formed to engage the stiffening strip 54 of the blades 46. One corner of plates 30 and 40 and companion clamp plate 48 is machined off for clearance suitable to expose one corner (the point) of its associated knife blade 46.

A circular cutout 62 shown best in FIG. 8 is provided in the pressure plate 56 and allows the knife blade 46, clamp plate 48 and thumb screw 50 of the bevelling knife plate 40 to swing between the two previously recited positions without interference.

A pair of grooves 64 is formed in the base 12 providing clearance paths for knife blades 46 as best shown in FIGS. 2, 4, and 8. This permits a clean cut to be made all the way through a work piece W positioned upon the base 12.

Bolt holes 66 are provided in the base 12 for a wing nut and bolt 68 on which to adjustably secure a slotted depth stop 70 against which a work piece W may be located. A table rule 72 is imprinted adjacent one groove 64 for determining the length of the cuts. A straight edge rule 74 is secured accurately perpendicular to the grooves 64 across the base 12 near one end to act as a squaring stop for locating a work piece and as a scale by which to set the depth stop 70.

With the work piece W thus located on the base 12 and the cut-length-determining stop 22 set and clamped as desired, the appropriate knife plate 30 or 40 is rotated to engage the knife blade 46 corner-wise with the work piece W as shown in FIGS. 6 and 8.

Figure 10:
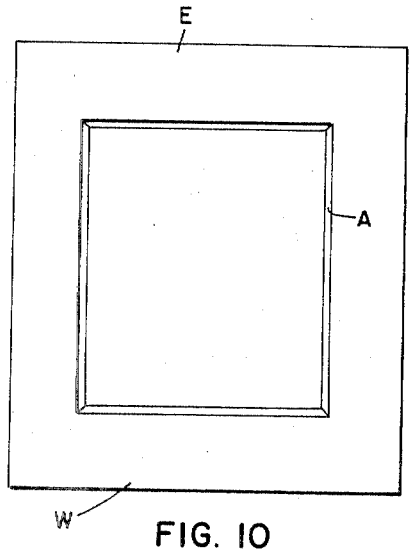
FIG. 10 is a plan view of a typical work piece after performing the cutting operations for fabricating a picture mat.

The cutter block 20 is then drawn upon its ways 14 from left to right to accomplish the desired cut. FIG. 10 illustrates a typical work piece W after the edges E are squarely trimmed and a bevel-edged aperture A has been cut out.

It is to be noted that an especially accurate bevel cut results because the ways design obviates "rod-riding" with its usual lack of stability inherent in prior arrangements.

An operator now is not required to carefully regulate pressure since there are no supporting rods to bond.

Obviously many modifications and variations of the present invention are possible in light of the above teachings. It is, therefore, to be understood that within the scope of the appended claims the invention may be practiced otherwise than as specifically described.

We claim:

1. A mat cutter, comprising, structure defining a base having a planar upper surface with a linear groove provided thereon, track means comprising a length of structural angle with the corner edge uppermost positioned above and across said upper surface, movable means mounted for movement along said track means, said movable means encompassing the upper face and the edges of the structural angle, pivotally mounted cutting means secured to said movable means and arranged to move downwardly into said groove to cut through a mat positioned on the upper surface of said base, and means for positively limiting depth movement of said cutting means.

2. A mat cutter as recited in claim 1, and limit means for limiting the movement of said movable means.

3. A mat cutter as recited in claim 1, wherein a face of said movable means is positioned angularly to the upper surface of said base, with said cutting means being positioned to move substantially parallel to said face downwardly into said groove.

4. A mat cutter as provided in claim 3, and additionally said means for positively limiting depth movement of said cutting means including friction means for clamping said cutting means.

5. A mat cutter as provided in claim 3, wherein said upper surface of base has a pair of parallel grooves provided therein, said movable means has at least one face arranged parallel to one of said grooves and an opposite face positioned at an angle thereto, with pivotally mounted cutting means positioned for movement parallel to each face, whereby either of said cutting means can be selectively selected to make either a straight or a bevel cut through a properly positioned mat.

6. A mat cutter as recited in claim 1, and scale means positioned on said upper surface for predetermining the size of a mat to be cut.